United States Patent
Solger

(10) Patent No.: US 9,976,501 B2
(45) Date of Patent: May 22, 2018

(54) METHODS AND SYSTEMS FOR ROTATING AN EXHAUST AFTERTREATMENT DEVICE

(71) Applicant: Ford Global Technologies, LLC, Dearborn, MI (US)

(72) Inventor: Michael Solger, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 14/922,570

(22) Filed: Oct. 26, 2015

(65) Prior Publication Data

US 2017/0114740 A1    Apr. 27, 2017

(51) Int. Cl.
| | |
|---|---|
| F01N 3/021 | (2006.01) |
| F02D 41/02 | (2006.01) |
| B01D 46/00 | (2006.01) |
| F01N 9/00 | (2006.01) |
| F02D 41/26 | (2006.01) |

(52) U.S. Cl.
CPC ..... *F02D 41/0235* (2013.01); *B01D 46/0005* (2013.01); *B01D 46/0063* (2013.01); *B01D 46/0067* (2013.01); *F01N 3/0214* (2013.01); *F01N 9/00* (2013.01); *F02D 41/029* (2013.01); *F02D 41/26* (2013.01); *B01D 2273/14* (2013.01); *F01N 2390/02* (2013.01); *F02D 2200/0812* (2013.01)

(58) Field of Classification Search
CPC . F02D 41/0235; F02D 41/26; B01D 46/0005; B01D 46/0063; F01N 3/0214; F01N 9/00
USPC .......................................................... 701/102
See application file for complete search history.

(56) References Cited

U.S. PATENT DOCUMENTS

| | | | |
|---|---|---|---|
| 4,066,425 A | 1/1978 | Nett | |
| 4,356,010 A | 10/1982 | Meyer zu Riemsloh | |
| 4,869,738 A | 9/1989 | Alcorn et al. | |
| 4,874,407 A * | 10/1989 | Lefkowitz | B01D 46/12 55/282.3 |
| 5,013,340 A * | 5/1991 | Taslim | F01N 3/0214 55/290 |
| 5,968,215 A | 10/1999 | Webb | |
| 7,371,266 B2 | 5/2008 | Streichsbier et al. | |
| 7,992,382 B2 | 8/2011 | Bailey | |
| 8,516,797 B2 | 8/2013 | Van Nieuwstadt | |
| 8,844,272 B2 | 9/2014 | Bidner et al. | |
| 2002/0078935 A1* | 6/2002 | Opris | F01N 3/0233 123/568.11 |
| 2011/0120090 A1 | 5/2011 | Sorensen, Jr. | |
| 2011/0167809 A1 | 7/2011 | Balloul et al. | |
| 2015/0034126 A1* | 2/2015 | Hedman | F01N 3/0214 134/18 |

FOREIGN PATENT DOCUMENTS

EP    2646662 B1    2/2015

* cited by examiner

*Primary Examiner* — Hai Huynh
*Assistant Examiner* — Gonzalo Laguarda
(74) *Attorney, Agent, or Firm* — Julia Voutyras; McCoy Russell LLP

(57) ABSTRACT

Methods and systems are provided for inverting a particulate filter housing. In one example, a method may include inverting the particulate filter housing to dislodge an ash load in the particulate filter.

6 Claims, 5 Drawing Sheets

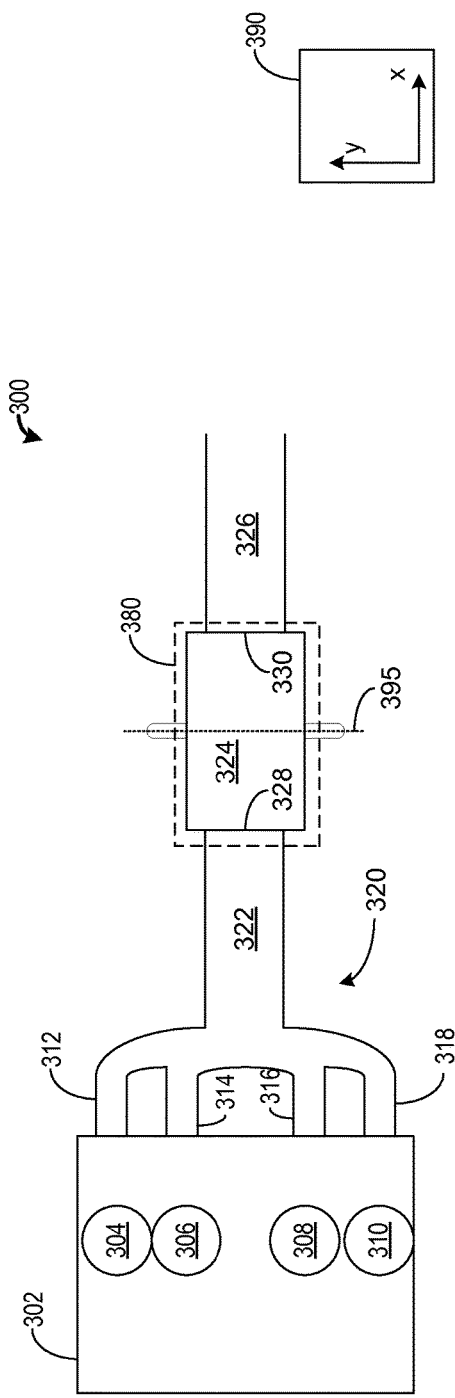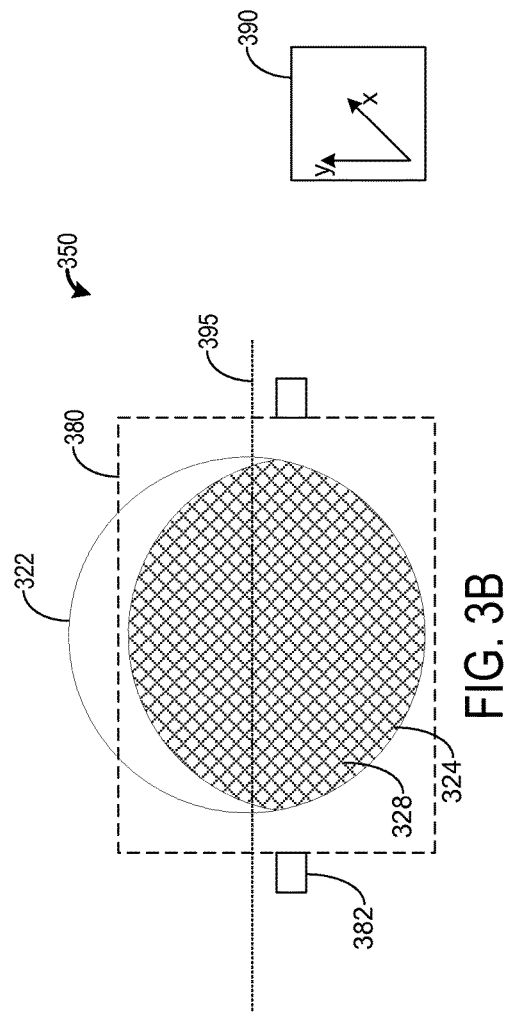
FIG. 3A
FIG. 3B

METHODS AND SYSTEMS FOR ROTATING AN EXHAUST AFTERTREATMENT DEVICE

FIELD

The present description relates generally to methods and systems for rotating a particulate filter housing.

BACKGROUND/SUMMARY

The exhaust gas emitted from an internal combustion engine may include a heterogeneous mixture that may contain gaseous emissions such as carbon monoxide (CO), unburned hydrocarbons (HC), nitrogen oxides ($NO_x$), and condensed phase materials (liquids and solids) that constitute particulate matter (PM). Transition and primary group metal catalysts typically coat a catalyst support along with substrates to provide an engine exhaust system the ability to convert some, if not all of these exhaust components into other compounds.

Exhaust aftertreament systems may include a three-way catalyst (TWC) and a particulate filter (PF). The TWC provides a passage for gaseous emissions to flow through and undergo oxidation and reduction reactions with the catalytic components. The TWC may not comprise a binding element, whereas the PF may comprise a binding element to capture PM.

Over time, the PF may become full and a regeneration operation may be used to remove trapped particulates. The regeneration involves increasing the temperature of the particulate filter to a relatively high temperature, such as above 600° C., in order to burn the accumulated particulates into ash.

A potential drawback with the regeneration process is ash accumulation subsequent to the regeneration process in spark-ignited engines. The high-exhaust temperatures of spark-ignited engines (e.g., 550° C.) vaporizes the water released after combustion, thereby disabling the ability for water to sweep the ash from the exhaust pathway. This is generally in contrast to diesel engines where the water is not vaporized due to lower exhaust temperatures (e.g., 90° C.) and is able to reduce the ash load. One example attempt to address ash build up includes injecting air to reduce ash accumulation, such as described in Sorensen et al. in U.S. Patent No. 2011/0120090. Therein, an oxygen injection is used to further burn an ash accumulation and remove it from the PF.

However, the inventors herein have recognized potential issues with such systems. As one example, an oxygen injection upstream of a PF may increase an exhaust gas temperature above a threshold that may degrade the filter. By injecting air to initiate a regeneration, the regeneration temperature may be more difficult to regulate and increase a PF temperature to a temperature in which the PF may be degraded.

In one example, the issues described above may be addressed by a method for inverting an exhaust aftertreatment housing of a disconnected exhaust passage end over end during vehicle operation. In this way, a purifying device in the housing may receive exhaust gas at opposite ends based on an inversion of the housing. The inversion may be achieved by operation of one or more electronically controlled actuators, such as a motor, via a vehicle control system responsive to sensed operating conditions.

As one example, a particulate filter may be located with the exhaust aftertreatment housing. The particulate filter may fluidly connect a first exhaust passage to a second exhaust passage, wherein the first passage is upstream of the second passage. A rotating arm may turn about a rotation axis via a motor thereby rotating the housing end over end about the axis and inverting the particulate filter. Exhaust gas from the engine flows in the same way to the housing, but due to the housing inversion, now flows through an opposite end of the particulate filter as compared to flow prior to the inversion. Therefore, accumulated ash on a backside of the filter may receive higher pressure exhaust gas following rotation of the filter, which may dislodge the ash and blow it out the filter.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A and 3B show a rotatable particulate filter housing with a particulate filter located therein and a cross-section depicting a rotation of the particulate filter, respectively.

DETAILED DESCRIPTION

Figure 1:
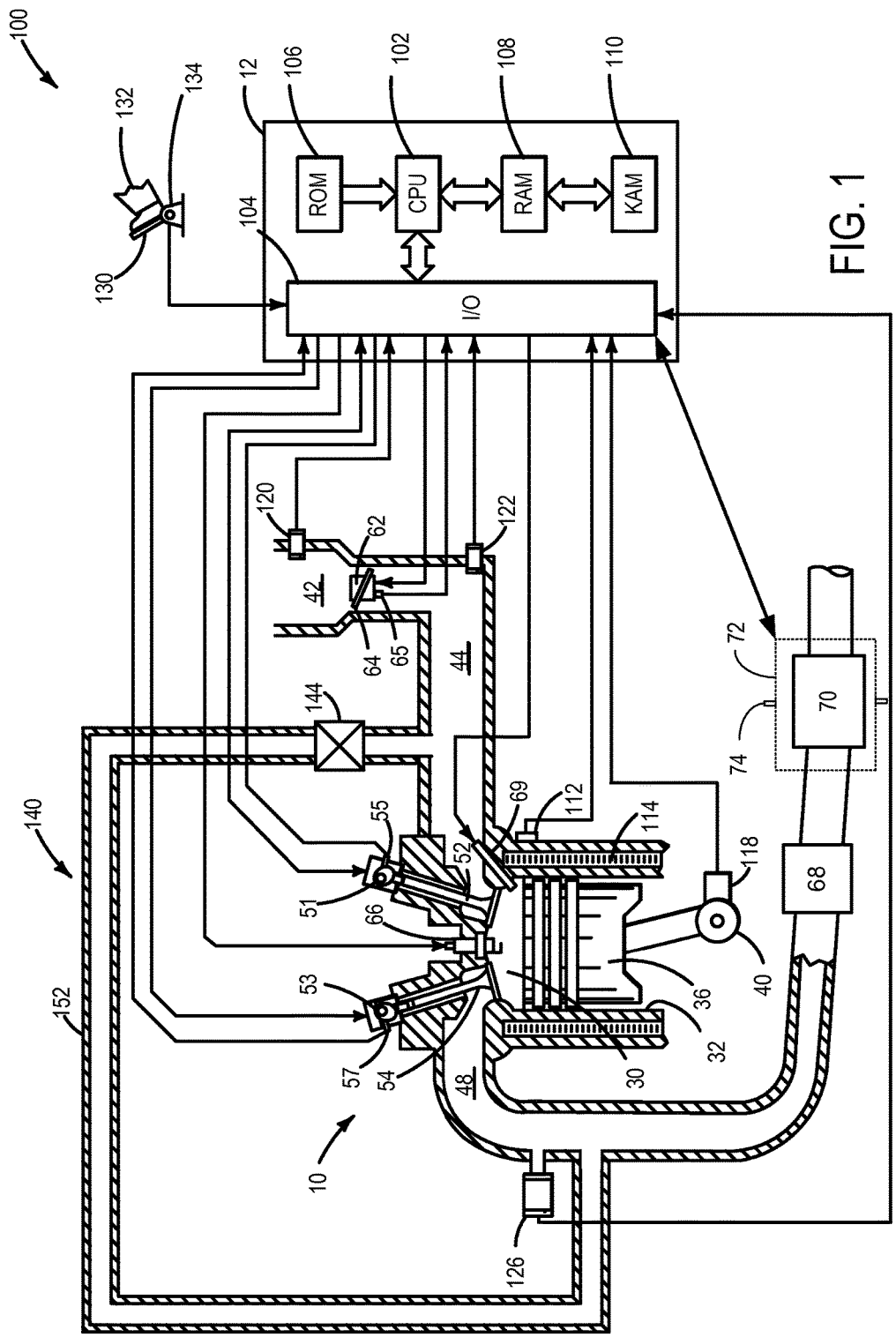
FIG. 1 illustrates an example cylinder of an engine.
Figure 2:
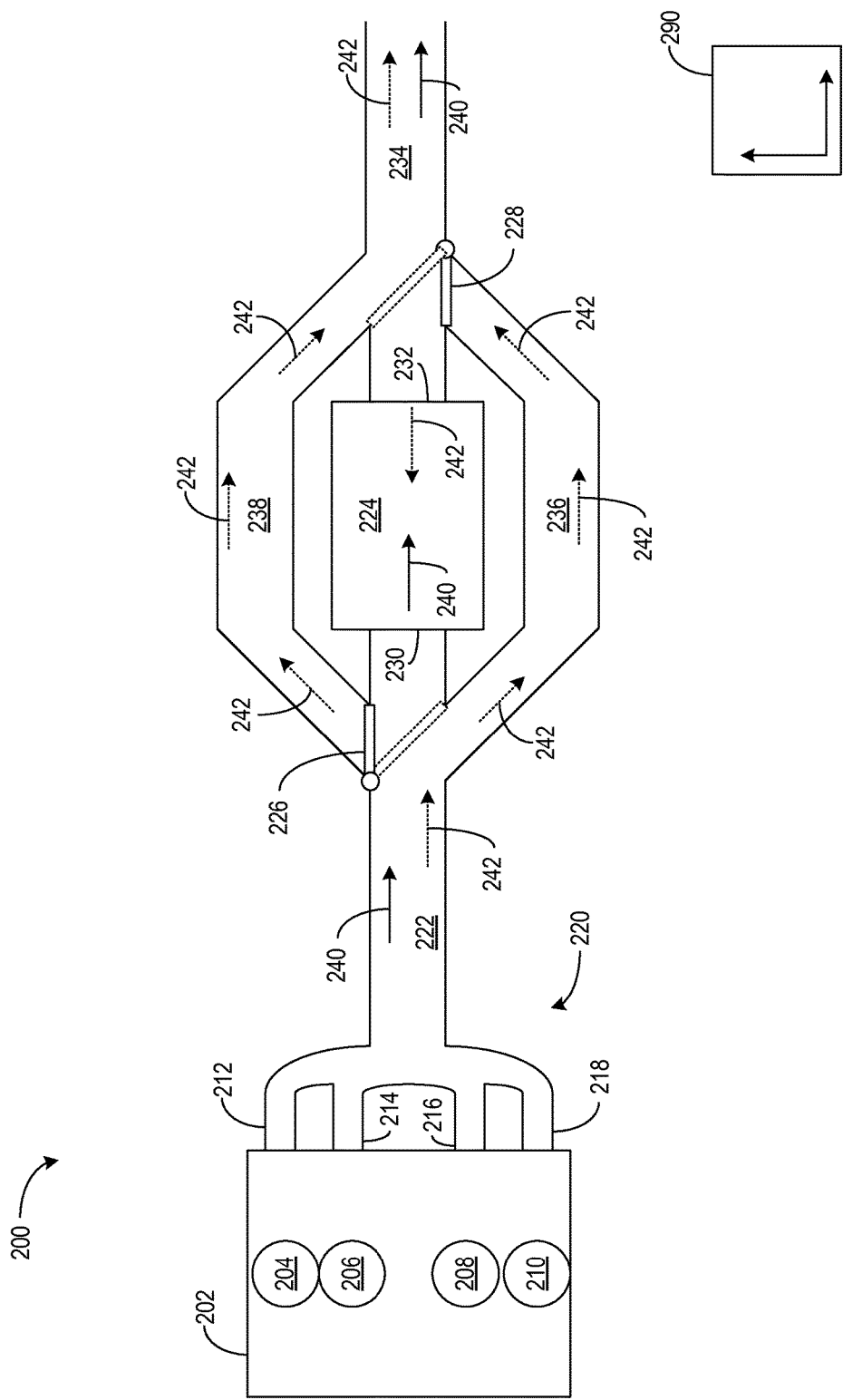
FIG. 2 shows a particulate filter with a valve system for reversing a direction of exhaust flow through the particulate filter.
Figure 4A:
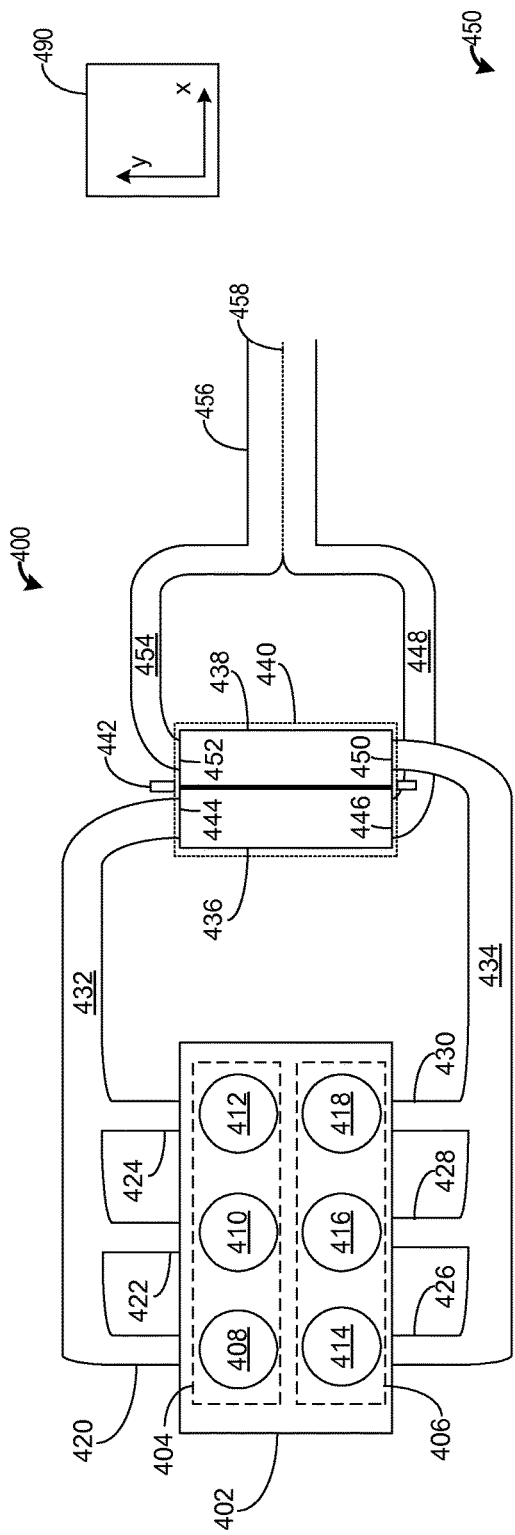
FIGS. 4A and 4B show a rotatable particulate filter housing with two particulate filters located therein and a cross-section depicting a rotation of the particulate filters, respectively.
Figure 4B:
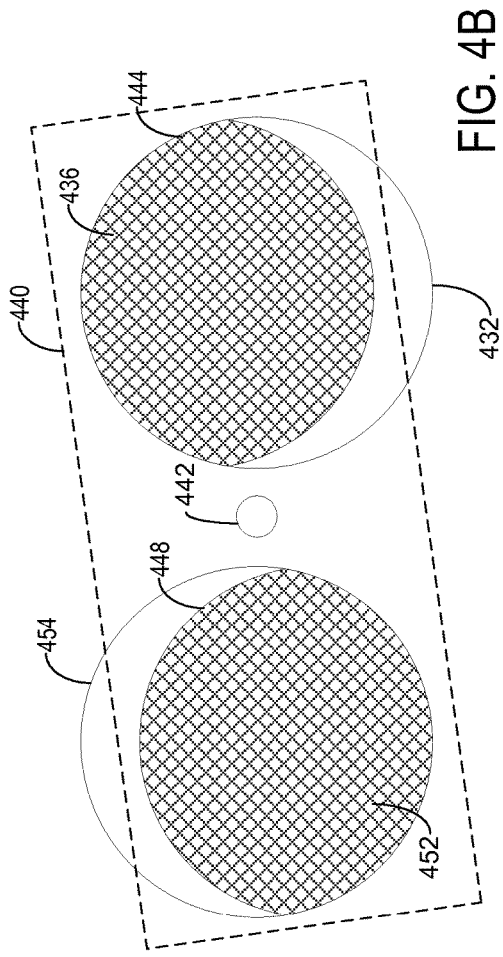
Figure 5:
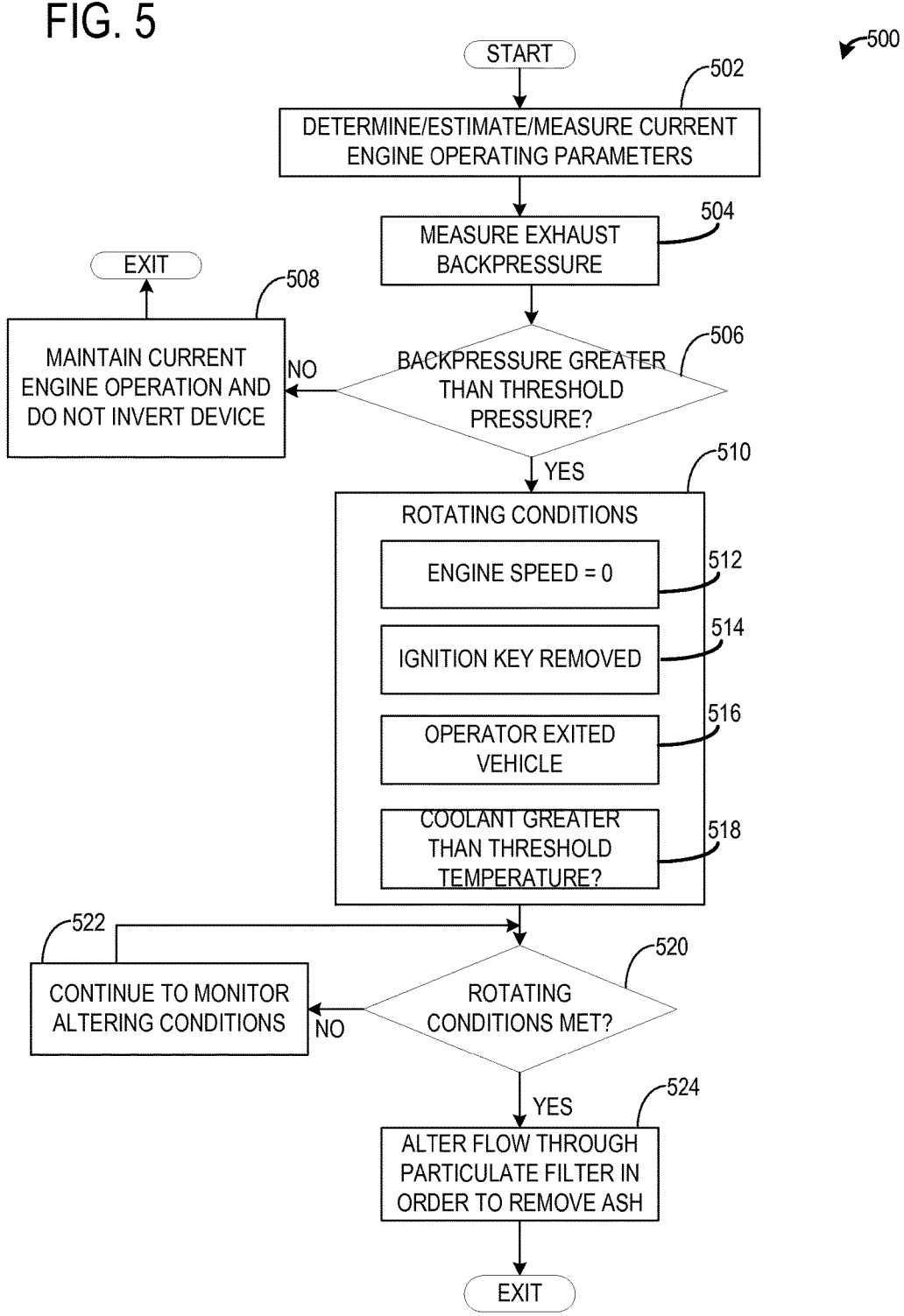
FIG. 5 shows a method for controlling inversions of an exhaust aftertreatment device and or the exhaust flow stream.

The following description relates to an example of an invertable exhaust aftertreatment housing comprising a particulate filter. An example cylinder coupled to an exhaust passage comprising the exhaust aftertreatment housing is shown in FIG. 1. In FIG. 2, an example valve system is shown for reversing a direction of exhaust flow through a particulate filter. A rotatable exhaust aftertreatment housing with a particulate filter located therein is shown fluidly coupling a first and second exhaust passages and rotating between the first and second exhaust passages are shown in FIGS. 3A and 3B, respectively. A rotatable exhaust aftertreatment housing with two particulate filters located therein is shown in FIG. 4A. A rotation of the exhaust aftertreatment housing and particulate filters is shown in FIG. 4B. The two particulate filters fluidly couple respective exhaust lines. A method for rotating an aftertreatment device is shown in FIG. 5.

In one example, the housing for the device is disconnected via an electronic controller for the rotation, but then a connection is re-established once the rotation is completed. The connection is then maintained until the next rotation, at which point again the housing may be disconnected. The controller may form the connection and generate the disconnected state by adjusting one or more actuators controlling a coupling between the stationary exhaust passages into and out of the housing, and the housing openings. In another example, the housing is continuously disconnected but during operating conditions aligned sufficiently to seal the exhaust passage and prevent leakage of exhaust flow.

FIGS. 2, 3A, 3B, 4A, and 4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10. The engine 10 may comprise a turbocharger, supercharger, or a combination thereof, and operation of the engine may include compressing intake air and then delivering to the engine cylinders, and then flowing exhaust from those cylinders to the exhaust system described herein.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves. In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 68 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 68 is shown arranged along the exhaust passage 48 downstream of the exhaust gas sensor 126. The device 68 may be a three way catalyst (TWC), $NO_x$ trap, selective catalytic reductant (SCR), various other emission control devices, or combinations thereof. In some examples, during operation of the engine 10, the emission control device 68 may be periodically reset by operating at least one cylinder of the engine within a particular air-fuel ratio.

A particulate filter (PF) 70 is shown arranged along the exhaust passage 48 downstream of the emission control device 68. A diameter of the PF 70 is greater than or equal to a diameter of the exhaust passage 48. An exhaust aftertreatment housing 72 may house the PF 70. The housing 72 may be rotatably coupled to the exhaust passage 48. Rotating arm 74 inverts the housing 72 end over end to alter an orientation of the PF and assist in decreasing an ash load to decrease a backpressure. Following inversion, exhaust is received by PF 70 through an opposite side compared to preceding the inversion. The PF 70 may be rotated based on one or more of a number of miles driven, an ash load, soot load, and an engine speed.

As an example, exhaust may enter the PF 70 through a first end (upstream side) for some period of time prior to a rotation event. After a number of regenerations, ash may accumulate at a second end (downstream side) of the PF 70.

As the ash accumulates, the rotation event may be requested in response to a backpressure exceeding a threshold backpressure. The PF 70 is rotated in response to one or more rotation conditions being met. Following the rotation of the PF 70, the second end becomes the upstream side and receives exhaust gas prior to the first end, which becomes the downstream side. Thus, the accumulated ash on the second end receives higher pressure exhaust gas and may become dislodged and able to be swept out of the PF 70 through the first end. The PF 70 will be described in greater detail below. In some examples, during operation of the engine 10, the particulate filter 70 may be periodically reset by operating at least one cylinder of the engine within a particular air-fuel ratio.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, the controller 12 may signal the rotating arm 74 of the housing 72 to rotate in response to a backpressure exceeding a threshold backpressure. The backpressure may be measured by an exhaust mass pressure sensor located upstream of the PF 70.

FIG. 2 shows a system 200 comprising an engine 202 with four cylinders arranged in a line. The engine 202 may be used similarly to engine 10 in the embodiment of FIG. 1. It should be understood, however, that though FIG. 2 shows four cylinders, engine 202 may include any number of cylinders. For example, engine 202 may include any suitable number of cylinders, e.g., 2, 3, 4, 5, 6, 8, 10, 12, or more cylinders in any configuration, e.g., V-6, I-6, V-12, opposed 4, etc. Though not shown in FIG. 2, each combustion chamber (i.e. cylinder) of engine 202 may include combustion chamber walls with a piston positioned therein. An axes system 290 is shown comprising of two axes, the horizontal axis and the vertical axis.

Each combustion chamber may exhaust combustion gases via an exhaust port coupled thereto. For example, exhaust ports 212, 214, 216, and 218 are shown in FIG. 2 coupled to cylinders 204, 206, 208, and 210, respectively. Each respective exhaust port may direct exhaust combustion gases from a respective cylinder to an exhaust manifold 220.

Exhaust gas from the combustion chambers may combine and mix within the exhaust manifold 220 at a region of confluence before flowing into an upstream exhaust passage 222 leading to a particulate filter (PF) 224. In the embodiment of FIG. 2, the PF 224 is fixed and may not be rotated. A first valve 226 and a second valve 228 control a direction of exhaust flow through the PF 224. The first valve 226 is upstream of the PF 224 and the second valve 228 is downstream of the PF. The valves may be actuated in congruence based on a backpressure generated by an ash load of the PF 224. Solid lines of the first valve 226 and the second valve 228 depict a first position of the valves. Dashed outlines of the first valve 226 and the second valve 228 depict a second position of the valves. The first 226 and second 228 valves move simultaneously, wherein both valves are either in the first position or the second position. Thus, the first 226 and second 228 valves may both be actuated concurrently via a single signal from a controller (e.g., controller 12 of FIG. 1).

For the first valve 226 and the second valve 228 in the first position, exhaust gas flows from the upstream exhaust passage 222, into a first side 230 of the PF 224, through the PF 224, out a second side 232 of the PF 224, and into a downstream exhaust passage 234. The second valve 228 allows substantially no exhaust gas to flow out a first auxiliary passage 236. The first valve 226 allows substantially no exhaust gas to flow into a second auxiliary passage 238. The exhaust gas flows in the horizontal direction as shown by solid line arrows 240.

The first auxiliary passage 236 and the second auxiliary passage 238 are extensions outside of the upstream exhaust passage 222 and the downstream exhaust passage 234. A geometry of the first auxiliary passage 236 is substantially similar to a geometry of the second auxiliary passage 236. The first auxiliary passage 236 and the second auxiliary passage 238 may only receive exhaust gas when the first valve 226 and the second valve 228 are in the second position. As shown, the valves in the first position point in the horizontal direction. The valves in the second position point between the horizontal and vertical directions. Therefore, the valves are actuated along the vertical axis when switching between the first position and the second position.

Exhaust gas flows from the upstream exhaust passage 222, through the first auxiliary passage 236, into the PF 224 via the second side 232, through the PF 224, out the PF 224 via the first side 230, through the second auxiliary passage 238, and into the downstream exhaust passage 234 when the first 226 and the second 228 valves are in the second position. In this way, exhaust gas enters the PF 224 through an opposite side when the valves are actuated to dislodge accumulated ash on the opposite side.

As an example, ash may accumulate at the second side 232 following PF regenerations when the valves are in the first position. As the ash load increases, a flow rate of exhaust gas through the PF 224 decreases (e.g., a backpressure increases). If the backpressure increases beyond a threshold backpressure, engine performance may decrease due to the backpressure inhibiting the engine from expelling exhaust gas. The valves may be actuated to the second position to reverse exhaust flow through the PF 224 and decrease an ash load. Exhaust enters the PF 224 via the second side 232 with the valves in the second position, thereby allowing the second side to receive exhaust gas greater in pressure compared to exhaust gas delivered to the second side when the valves are in the first position. The higher pressure exhaust gas may dislodge the accumulated ash of the second side 232 and sweep the ash out the first end 230 and into the downstream exhaust passage 234. As the ash load decreases, the backpressure also decreases. The valves may be actuated back to the first position in response to an ash load on the first side creating a backpressure greater than the threshold backpressure. Additionally or alternatively, the valves may be actuated back to the first position following reduction of the ash load on the second side 232.

As shown by dashed arrows 242, the direction of exhaust flow through the PF 224 when the first valve 226 and the second valve 228 are in the second position is reversed compared to exhaust flow with the valves in the first position (shown by arrows 240). A distance of exhaust flow for the valves in the second position is greater than a distance of exhaust flow for the valves in the first position. In one example, the distance of exhaust flow for the valves in the second position is at least three times greater than the distance of exhaust flow in the first position.

For first 226 and second 228 valves in the first position, the first side 230 receives higher pressure exhaust gas compared to an exhaust gas pressure received by the second side 232 and ash accumulates onto the second side 232 following PF regenerations. For valves in the second position, the second side 232 receives higher pressure exhaust gas compared to an exhaust gas pressure received by the first side 230 and ash accumulates onto the first side 230 following PF regenerations.

FIG. 3 shows a system 300 comprising an engine 302 with four cylinders arranged inline. The engine 302 may be used similarly to engine 10 in the embodiment of FIG. 1 or it may be used similarly to engine 202 in the embodiment of FIG. 2. Engine 302 may include a plurality of combustion chambers (i.e., cylinders). Engine 302 may include combustion chambers 304, 306, 308, and 310, arranged in an inline configuration. It should be understood, however, that though FIG. 3 shows four cylinders, engine 302 may include any number of cylinders. For example, engine 302 may include any suitable number of cylinders, e.g., 2, 3, 4, 5, 6, 8, 10, 12, or more cylinders in any configuration, e.g., V-6, I-6, V-12, opposed 4, etc. Though not shown in FIG. 3, each combustion chamber (i.e. cylinder) of engine 302 may include combustion chamber walls with a piston positioned therein. An axes system 390 is shown comprising two axes, an x-axis direction in the horizontal direction and a y-axis directed in the vertical direction. A rotation axis 395 of a PF housing 380 is shown by a dashed line.

Each combustion chamber may exhaust combustion gases via an exhaust port coupled thereto. For example, exhaust ports 312, 314, 316, and 318 are shown in FIG. 3 coupled to cylinders 304, 306, 308 and 310, respectively. Each respective exhaust port may direct exhaust combustion gases from a respective cylinder to an exhaust manifold 320.

Exhaust gas from the combustion chambers may combine and mix within the exhaust manifold 320 at a region of confluence before flowing into a first exhaust passage 322 leading to a particulate filter (PF) 324. The PF 324 may be located in the housing 380 where the housing and the PF may be rotated end over end via an arm 382. The arm may be rotatably coupled to the housing 380 and/or the PF 324. The PF 324 bridges the first exhaust passage 322 to a second exhaust passage 326. In other words, the first exhaust passage and the second exhaust passage are disconnected with a gap located therebetween. The particulate filter 324 traverses the gap.

As shown, the PF 324 comprises a first end 328 and a second end 330. In a first position of the PF 324, the first end 328 is adjacent the first exhaust passage 322 and the second end 330 is adjacent the second exhaust passage 326. As the rotating arm 382 turns the housing 380 end over end about the rotating axis 395, the first end 328 and the second end 330 switch positions. Thus, in a second position following rotation of the PF 324 in the first position, the first end 328 may be adjacent the second exhaust passage 326 and the second end 330 may be adjacent the first exhaust passage 322. The first passage 322 is closer to the engine 302 while the second passage 326 is closer to a tailpipe.

When in the first position, ash may accumulate onto the second end 330 of the PF 324 following regenerations of accumulated soot in the PF. As described above, the ash may increase an exhaust backpressure to a backpressure greater than threshold backpressure and decrease engine performance. The PF 324 may be inverted in response to the backpressure exceeding the threshold backpressure moving the second end 232 adjacent the first exhaust passage 322 and enabling higher pressure exhaust to flow directly to the second end. The higher pressure exhaust may dislodge the accumulated ash and decrease the exhaust backpressure.

The housing 380 and the PF 324 fluidly connect the first exhaust passage 322 to the second exhaust passage 326. The exhaust passages are not fluidly connected when rotating the housing 380 due to a misalignment of the PF 324 with the first 322 and second 326 exhaust passages. Therefore, conditions for rotating the housing 380 may include engine conditions where exhaust gas is not produced (e.g., engine off, ignition key removed from vehicle, etc.). Additionally or alternatively, the PF 324 may be rotated when the conditions for rotating the housing 380 are met before the backpressure exceeds the backpressure threshold in order to prevent increasing ash accumulation. In this way, rotating the housing 380 and PF 324 disconnects a fluid communication between the PF 324 and the first 322 and second 326 exhaust passages.

FIG. 3B shows a cross-sectional view 350 down a first exhaust passage 322 of the system 300 of FIG. 3A. As such, components previously introduced in FIG. 3A are similarly numbered in FIG. 3B. The PF 324 is indicated by a checkered fill. The housing 380 is rotating about the rotating axis 395 via an actuation of the rotating arm 382. The PF 324 is misaligned with the first passage 322 and the second passage (not shown). Said another way, the PF 324 moves outside a path of the first 322 and second exhaust passages and becomes oblique and/or perpendicular to the exhaust passages until the rotation is complete. Thus, the first passage 322 and the second passage are partially fluidly coupled with the PF 324 while a remaining portion is fluidly coupled with an ambient atmosphere, in the current rotation position. As the PF 324 continues to rotate, the first passage 322, second passage 326, and the PF 324 may no longer be fluidly coupled (e.g., the PF 324 is perpendicular to the first passage 322 and the second passage 326). Therefore, if the exhaust flows through the first exhaust passage 322 when rotating the housing 380, then a portion of exhaust gas flows through the PF 324 and into either the second exhaust passage or the ambient atmosphere, while a remaining portion flows directly into the ambient atmosphere without flowing into the PF 324. In this way, the housing is only rotated during engine conditions that do not include producing exhaust gas to prevent flowing exhaust into the ambient atmosphere.

The axes system 390 shows the x-axis being substantially equal to a direction of exhaust flow through the first passage 322 in the cross-sectional view 350. The housing 380 rotates about the rotating axis 395 along the y-axis. As shown, the PF 324 is in the first position with the first side 328 adjacent the first passage 322. Rotating the housing 380 from the first position includes rotating the first side along the negative y-axis axis while rotating the second side (not shown) along with the positive y-axis. Rotation is complete when the PF 324 aligns with the first 322 and second exhaust passages and all of the exhaust flow from the first exhaust passage 322 flows through the PF 324 and into the second exhaust passage.

The rotating arm 382 may rotate the housing 380 by 180 degrees to move from the first position to the second position, inverting the PF 324. The rotating arm 382 may rotate the housing another 180 degrees to transition from the second position to the first position. Therefore, the housing has a rotating range of 360 degrees. Alternatively, the rotating arm 382 may rotate the housing 380 negative 180 degrees to transition from the second position to the first position. Thus, the housing may alternatively have a rotating range of +180 degrees. In one example, the rotating arm may be connected to an electric motor coupled to the engine control system of FIG. 1 and receiving an actuation signal from the controller 12 and/or sending sensed position and/or angle signals back to controller 12 so that the controller can control the housing to a desired position and/or angle via feedback control in response to the sensed information by a sensor coupled to the arm and/or housing, optionally during vehicle operation but while and/or in response to the engine shut down (for example during hybrid vehicle operation or vehicle on but engine off operation).

FIG. 4A shows a system 400 with an engine 402 comprising at least two cylinder banks wherein a first bank comprises at least one cylinder and a second bank comprises a different cylinder. A first bank 404 comprises cylinders 408, 410, and 412 indicated by a dashed box. A second bank 406 comprises cylinders 414, 416, and 418 also indicated by a dashed box. The engine 402 may be a V-6 engine where the first bank and the second bank both comprise three cylinders oblique to an axial axis of the engine. It will be appreciated by someone skilled in the art that the engine 402 may be other suitable shapes and configurations. An axes system is shown comprising two axes, an x-axis directed in the horizontal direction and a y-axis directed in the vertical direction.

The cylinders 408, 410, and 412 release combustion gases to a first set of respective exhaust runners 420, 422, and 424. The cylinders 414, 416, and 418 release combustion gases to a second set of respective exhaust runners 426, 428, and 430. Exhaust gas from cylinders of the first bank does not mix with exhaust gas from cylinders of the second bank. Exhaust gas from the first set of exhaust runners flows through a first upstream exhaust passage 432 toward a first particulate filter 436. Exhaust gas from the second set of exhaust runners flows through a second upstream exhaust passage 434 toward a second particulate filter 438. The particulate filters are located between the first 432 and the second 434 upstream exhaust passages such that the exhaust passages bend toward each other in order to direct exhaust gas to the filters. The exhaust passages do not combine or mix exhaust gas.

As depicted, the second upstream exhaust passage 434 crosses over an outlet (e.g., first downstream exhaust passage 448) to reach the second particulate filter 438. Thus, the second particulate filter 438 may be vertically higher along the y-axis than the first particulate filter 436. Alternatively, the second upstream exhaust passage 434 may curve around the first downstream exhaust passage 448 allowing the first and second filters to be substantially equal on the y-axis.

The first 436 and the second 438 particulate filters are located within a common rotatable housing 440 as indicated by a dashed box. The first 436 and the second 438 particulate filters are not in fluid communication and exhaust gas in one of the filters does not mix with exhaust gas in the other. The housing 440 may be rotated by a rotating arm 442 about a rotation axis 495 moving the first particulate filter 436 to the location of the second particulate filter 438 and vice-versa. The arm 442 may rotate the housing 440 through a range of +180 degrees or 360 degrees to transition between the first position and the second position. The housing 440 is shown in a first position wherein the first particulate filter 436 receives exhaust gas from the only first bank 404 and the second particulate filter 438 receives exhaust gas from only the second bank 406. However, upon rotating the housing 440 about the axis 495 via the arm 442 from the first position to the second position, the first particulate filter 436 receives exhaust gas from only the second bank 406 and the second particulate filter 438 receives exhaust gas from only the first bank 404.

In one embodiment, additionally or alternatively, the housing 440 may be rotated such that the filters may be rotated similarly to the PF 324 of FIG. 3A, wherein the first particulate filter 436 remains fluidly coupled to the first bank 404 and the second particulate filter 438 remains fluidly coupled to the second bank 406. Rotating the housing 440 inverts the filters and does not allow the filters to trade places (e.g., first filter remains fluidly coupled to the first bank following rotation and the second filter remains fluidly coupled to the second bank following rotation).

Exhaust gas flows from the first upstream exhaust passage 432, through a first side 444 of the first particulate filter 436, into the first particulate filter 436, out a second side 446, and into a first downstream exhaust passage 448. The first downstream exhaust passage 448 is disconnected from the first upstream exhaust passage 432. Thus, the first particulate filter 436 fluidly connects the first upstream exhaust passage 432 and the first downstream exhaust passage 448 when in the first position.

Exhaust gas flows from the second upstream exhaust passage 434, through a first side 450 of the second particulate filter 438, into the second particulate filter 438, out a second side 452 of the second particulate filter 438, and into a second downstream exhaust passage 454. The second downstream exhaust passage is disconnected from the second upstream exhaust passage 434. Thus, the second particulate filter 438 fluidly connects the second upstream exhaust passage 434 and the second downstream exhaust passage 454 when in the first position. The second downstream exhaust passage 454 is not in fluid communication with the first downstream exhaust passage 448.

When the housing 440 rotates to the second position, the first particulate filter 436 fluidly connects the second upstream exhaust passage 434 to the second downstream exhaust passage 454 and the second particulate filter 438 fluidly connects the first upstream exhaust passage 432 to the first downstream exhaust passage 448. When in the second position, exhaust gas flows from the first upstream exhaust passage 432, through the second side 452 of the second particulate filter 438, into the second particulate filter 438, out the first side 450 of the second particulate filter 438, and into the first downstream exhaust passage 448. Exhaust gas flows from the second upstream exhaust passage 434, through the second side 446 of the first particulate filter 436, into the first particulate filter 436, out the first side 444 of the first particulate filter 436, and into the second downstream exhaust passage 454. In this way, enters and exits the first and second particulate filters in the second position through opposite ends compared the first position. By doing this, the exhaust gas may dislodge accumulated ash within at least one of the filters and reduce an exhaust backpressure.

A direction of exhaust flow in the first particulate filter is opposite a direction of flow in the second particulate filter. Thus, a direction of exhaust flow through a particulate filter is reversed upon rotation (e.g., inversion) of the housing 440. As an example, a direction of exhaust flow through the first particulate filter from the first exhaust passage 432 in the first position is opposite a direction of exhaust flow through the first particulate filter from the second exhaust passage 434 in the second position. In other words, an entrance of the first particulate filter 436 may become an exit upon inversion of the housing 440. The housing 440 may be rotated via a rod or another suitable rotating device.

Exhaust gas from the first downstream passage 448 and the second downstream passage 454 flow into a commonly shared passage 456 where exhaust gas from the first 404 and the second 406 banks may mix. Alternatively, the passage 456 may comprise a barrier 458 for maintaining a separation of the exhaust gas from the cylinder banks, as indicated by a dashed line.

FIG. 4B shows a cross-sectional view 450 of the particulate filters of the system 400 of FIG. 4A. As such, components previously introduced in FIG. 4A are similarly numbered in FIG. 4B. The axis system 490 is depicted to match the perspective of the view 450. The first 436 and the second 438 particulate filters are checkered. The housing 440 is depicted via a dashed box. The filters are spaced away from one another in the housing 440 and are not in fluid communication.

As shown, the housing 440 is rotating from the first position to the second position via an actuation of the rotation arm 442. As described above with regard to other embodiments, the rotating arm may be coupled to a motor so that the rotation may be automatically initiated and controlled by the controller. The first particulate filter 436 rotates upward along the positive y-axis, becoming misaligned with the first upstream exhaust passage 432 and the first downstream exhaust passage. The second particulate filter 438 rotates downward along a negative y-axis, becoming misaligned with the second downstream exhaust passage 454 and the first upstream exhaust passage. In this way, the filters may become oblique and/or perpendicular to a direction of exhaust flow during the rotation.

As described above, the rotation arm 442 inverts the housing 440 end over end causing the first 436 and second 438 particulate filters to trade locations (e.g., positions). For example, if the first particulate filter is in fluid communication with the first bank 404 and the second particulate filter is in fluid communication with the second bank 406 in the first position, then the first particulate filter is in fluid communication with the second bank 406 and the second particulate filter is in fluid communication with the first bank 404 in the second position.

FIG. 5 shows a method 500 for rotating a rotatable exhaust aftertreatment device comprising at least one particulate filter located in at least one exhaust passage. The method 500 may be also be used to rotating one or more valves for redirecting exhaust flow through a particulate filter. Specifically, the rotatable exhaust aftertreatment device may be a rotatable particulate filter and or a rotatable housing comprising one or more particulate filters. Instructions for carrying out method 500 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 500 begins at 502, where the method includes determining, estimating, and/or measuring current engine operating parameters. The current engine operating parameters may include one or more of engine speed, engine load, vehicle speed, manifold vacuum, exhaust flow, engine temperature, coolant temperature, and air/fuel ratio.

At 504, the method 500 estimates an exhaust backpressure. The exhaust backpressure may be substantially equal to a difference between an expected exhaust flow rate and a measured exhaust flow rate measured by an exhaust gas sensor (e.g., a mass air flow sensor). Thus, as the difference increases, the exhaust backpressure also increases. The exhaust backpressure may be generated via an ash build up within at least one particulate filter of the exhaust passage. As described above, ash may accumulate within a particulate filter after a regeneration of the particulate filter. The burned soot (ash) may stick to a back portion of the particulate filter and restrict the flow of exhaust through the filter.

At 506, the method 500 determines if the exhaust backpressure is greater than a threshold backpressure. The threshold backpressure may be based on a backpressure impeding exhaust flow which may result in a decreased engine combustion stability and/or decreased ability of the engine to expel exhaust gas into the exhaust passage. If the backpressure is not greater than the threshold backpressure, then the method 500 may proceed to 508 to maintain a current engine operation and to not rotate the particulate filter or the particulate filter housing. In this way, the ash load of the at least one particulate filter does not decrease a performance of the engine.

If the backpressure is greater than the threshold pressure, then the method 500 may proceed to 510 in order to measure one or more rotating conditions. In some embodiments, additionally or alternatively, 506 may be omitted from the method 500 such that the method 500 may proceed to 510 directly after 502. In this way, the at least one particulate filter may be inverted when inverting conditions are met in order to prevent ash accumulating. Additionally or alternatively, 506 may be based on other suitable conditions, for example, miles driven.

At 510, the method 500 includes determining if the rotating conditions are met. The rotating conditions include an engine speed being substantially equal to zero 512, an ignition key being removed from an ignition 514, an operator exited the vehicle 516, and a coolant temperature being at an operating temperature 518. The above conditions may be measured to prevent exhaust flowing directly to an ambient environment without flowing through the particulate filter. As described above, upstream and downstream exhaust passages of a disconnect exhaust passage are not fluidly coupled during rotation of the particulate filter.

In one example, an engine may be shut-off for an extended period of time in a cold climate. The engine may be started and deactivated again before the coolant temperature reaches the operating temperature. Thus, engine speed may be 0, the ignition key may be removed, and the operator is outside the vehicle while the coolant temperature is less than the operating temperature. In one embodiment, the at least one particulate filter may not be inverted in response to the above conditions. In another embodiment, the at least one particulate filter may be rotated in response to the above conditions.

At 520, the method 500 includes determining if one or more of the rotating conditions are met. If none of the rotating conditions are met, then the method 500 proceeds to 522 to continue monitoring if rotation conditions are met. As an example, none of the rotation conditions may be met for a vehicle operating at low loads. As another example, none of the rotation conditions may be met for a vehicle idling at a stop light. Vehicle conditions may be met for a vehicle shutting down and an operator exiting the vehicle subsequent vehicle operation.

If one or more of the rotation conditions are met, then the method 500 proceeds to 524 to rotate the at least one particulate filter and remove the accumulated ash within the filter. In some embodiments, additionally or alternatively, the method 500 may proceed to 524 when all of the rotation conditions are met. As described above, when rotating the at least one particulate filter from a first position to a second position, exhaust gas enters the particulate filter from a different side. Thus, a backside of the particulate filter in the first position may become a front side of the particulate filter in the second position. A likelihood of dislodging the ash increases by rotating the particulate filter due to the increase exhaust pressure directed toward the ash. In this way, the exhaust backpressure and ash load in the particulate filter are decreased.

Alternatively, for a particulate filter with one or more valve for redirecting exhaust flow through a filter body, similar to the filter of FIG. 2, the valve(s) may be rotated to shift a flow of exhaust from a first direction through the filter to a second direction through the filter, wherein the first direction is opposite the second direction. In this way, exhaust flow through the filter is inverted in response to one or more of the above described conditions being met for rotating valve(s) to remove ash.

In one example, the engine is first operated with the housing in a first position, and then responsive to selected conditions as noted herein, during an engine off condition, the controller rotates the housing to the second position and then operates the engine with the housing in the second position. Further, responsive to selected conditions as noted herein, during another engine off condition, the controller rotates the housing back to the first position and then operates the engine with the housing in the first position. While the rotating for each instance may only occur during engine off conditions, alternative approaches may be used such as rotation during engine pumping air without combustion (e.g., during deceleration fuel shut-off) conditions.

In this way, a particulate filter may be rotated to decrease an ash load within the filter. Exhaust flow enters from a different side of the filter due to the rotation enabling the ash load to experience a greater pressure of exhaust gas. The increased exhaust pressure dislodges the accumulated ash and directs it out the particulate filter and into a remainder of an exhaust system. The technical effect of rotating a particulate filter to remove exhaust gas is to decrease an exhaust backpressure and to increase engine performance.

A method includes inverting an exhaust aftertreatment housing of a disconnected exhaust passage end over end. In a first example of the method wherein the inverting alters a position of a particulate filter located within the housing. In a second example of the method optionally includes the first example and further comprises fluidly coupling a first passage and a second passage of the disconnected exhaust passage with the particulate filter. In a third example of the method optionally including the first and/or second examples and further includes inverting the housing includes actuating a rotatable arm of the housing at least 180 degrees. In a fourth example of the method optionally including one or more of the first through third example and further including inverting being in response to an exhaust backpressure exceeding a threshold backpressure.

A second method includes bridging a gap between disconnected upstream and downstream exhaust passages with a particulate filter and rotating a housing of the particulate filter end over end to flip the particulate filter between a first position and a second position. In a first example of the second method further includes rotating the housing from the first position to the second position includes reversing an inlet and outlet ends of the particulate filter. In a second example of the second method optionally including the first example and further includes rotating the housing misaligns the particulate filter with the upstream and downstream exhaust passages to be oblique or perpendicular to a direction of exhaust flow through the exhaust passages. In a third example of the second method optionally including the first and/or second examples and further includes rotating the housing is in response to one or more of an ignition key being removed, an engine being off, and an operator being outside a vehicle. In a fourth example of the second method optionally including the first through third examples and further includes rotating the housing includes actuating a rotating arm of the housing. In a fifth example of the second method optionally including the first through fourth examples and further includes rotating the housing includes disconnecting a fluid communication between the particulate filter and the upstream and downstream exhaust passages.

A system includes an engine with a cylinder bank comprising at least one cylinder, an upstream exhaust passage disconnected from a downstream exhaust passage where the upstream exhaust passage fluidly coupled to a first side of a particulate filter and the downstream exhaust passage fluidly coupled to a second opposite side of the particulate filter, a rotatable housing with a rotating arm and housing the particulate filter, a controller with computer-readable instructions for rotating the housing of the particulate filter in response to one or more engine conditions to fluidly couple the second side to the upstream exhaust passage and fluidly coupled the first side to the downstream exhaust passage. In a first example of the system further includes the particulate filter fluidly coupling the upstream exhaust passage to the downstream exhaust passage when it is not rotating by bridging a gap located between the upstream and downstream exhaust passages. In a second example of the system optionally including the first example and further includes the housing having a rotating range of ±180 degrees. In a third example of the system optionally including the first and/or second examples and further includes the cylinder bank being a first cylinder bank and the engine further comprising a second cylinder bank with a different cylinder bank than the first cylinder bank. In a fourth example of the system optionally including the first through third examples and further includes the upstream exhaust passage being a first upstream exhaust passage, the downstream exhaust passage being a first downstream exhaust passage, and the particulate filter being a first particulate filter, further comprising a second upstream exhaust passage, a second downstream exhaust passage, and a second particulate filter. In a fifth example of the system optionally including the first through fourth examples and further includes the first cylinder bank being fluidly coupled with the first upstream passage and the second cylinder bank being fluidly coupled with the second upstream passage. In a sixth example of the system optionally including the first through fifth examples and further includes the first and second particulate filters are spaced apart within the housing. In a seventh example of the system optionally including the first through sixth examples and further includes the housing rotates end over end and fluidly couples the first particulate filter to the first upstream passage and the second particulate filter to the second upstream passage in a first position. In an eighth example of the system optionally including the first through seventh examples and further includes the housing rotates end over end and fluidly couples the first particulate filter to the second upstream passage and the second particulate filter to the first upstream passage in a second position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
bridging a gap between spatially separated upstream and downstream exhaust passages with a particulate filter; and
rotating a housing of the particulate filter about an axis offset from a central axis of the particulate filter to flip the particulate filter between a first position and a second position responsive to a determination that an operator is outside a vehicle having the particulate filter, the method including determining the operator is outside the vehicle.

2. The method of claim 1, wherein rotating the housing from the first position to the second position includes reversing inlet and outlet ends of the particulate filter, wherein the housing is rotated at least 180 degrees.

3. The method of claim 1, wherein rotating the housing misaligns the particulate filter with the upstream and downstream exhaust passages to be oblique or perpendicular to a direction of exhaust flow through the exhaust passages.

4. The method of claim 1, wherein rotating the housing of the particulate filter includes rotating it end over end by actuating a rotating arm of the housing to flip the particulate filter between the first position and the second position.

5. A method, comprising:
bridging a gap between spatially separated upstream and downstream exhaust passages with a particulate filter; and
rotating a housing of the particulate filter end over end by actuating a rotating arm of the housing to flip the particulate filter between a first position and a second position, including disconnecting a fluid communication between the particulate filter and the upstream and downstream exhaust passages.

6. A method, comprising:
bridging a gap between spatially separated upstream and downstream exhaust passages with a particulate filter; and
rotating a housing of the particulate filter end over end by actuating a rotating arm of the housing to flip the particulate filter between a first position and a second position, wherein rotating the housing is performed responsive to an engine of a vehicle having the particulate filter being off, the method including determining the engine is off.

* * * * *